(12) United States Patent
Huang et al.

(10) Patent No.: US 9,810,835 B2
(45) Date of Patent: Nov. 7, 2017

(54) BACKLIGHT MODULE

(71) Applicant: AU OPTRONICS CORPORATION, Hsin-Chu (TW)

(72) Inventors: Yu-Chieh Huang, Hsin-Chu (TW); Cheng-Min Tsai, Hsin-Chu (TW); Cheng-Yu Wang, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 94 days.

(21) Appl. No.: 15/096,392

(22) Filed: Apr. 12, 2016

(65) Prior Publication Data

US 2016/0306093 A1    Oct. 20, 2016

(30) Foreign Application Priority Data

Apr. 17, 2015   (TW) .............................. 104112449 A

(51) Int. Cl.
*F21V 7/04*     (2006.01)
*F21V 8/00*     (2006.01)

(52) U.S. Cl.
CPC ........... *G02B 6/009* (2013.01); *G02B 6/0031* (2013.01); *G02B 6/0083* (2013.01); *G02B 6/0088* (2013.01)

(58) Field of Classification Search
CPC .... G02B 6/009; G02B 6/0088; G02B 6/0031; G02B 6/0083
See application file for complete search history.

(56) References Cited

U.S. PATENT DOCUMENTS

| 2011/0116011 A1* | 5/2011 | Isobe | F21V 19/04 |
| | | | 349/62 |
| 2011/0273642 A1* | 11/2011 | Kweon | G02B 6/0083 |
| | | | 349/62 |

FOREIGN PATENT DOCUMENTS

| JP | 06-338544 | 12/1994 |
| JP | 2011-081976 | 4/2011 |

* cited by examiner

*Primary Examiner* — Evan Dzierzynski
(74) *Attorney, Agent, or Firm* — McClure, Qualey & Rodack, LLP

(57) ABSTRACT

A backlight module including a back plate, a light source module and a connecting strip is provided. The light source module is disposed on the back plate and includes a substrate and a plurality of light sources, wherein the substrate extends in an extending direction, and the plurality of light sources are disposed on the substrate. The connecting strip connects the substrate and the back plate and includes a substrate-connecting section and a back plate-connecting section, wherein the substrate-connecting section is attached to the substrate, the back plate-connecting section is attached to the back plate. The substrate-connecting section has a first width parallel to the extension direction, the back plate-connecting section has a second width parallel to the extension direction and smaller than the first width, in which the outmost light sources disposed at two sides along the extension direction protrudes respectively beyond two opposite ends of the back plate-connecting section.

14 Claims, 8 Drawing Sheets

BACKLIGHT MODULE

BACKGROUND OF THE INVENTION

1. Field of the Invention

The present invention generally relates to an impact-resistant backlight module. Particularly, the present invention relates to a backlight module having cushion effect.

2. Description of the Prior Art

Flat-panel display devices, such as the LCD devices, usually have flat light sources in the backlight structure. A flat light source usually includes a light source, such as a LED light bar, and a light-guiding unit, such as a light guide plate; in which the light-guiding unit is for progressing light, changing light's direction, as well as emitting thereof so that provides the desired flat light source.

As shown in FIGS. 1A-1B, the backlight structure 90 includes a back plate 80, a LED light bar 900 and a light guide plate 800. The LED light bar 900 and the light guide plate 800 are disposed on the back plate 80, in which the LED light bar 900 includes a circuit plate 910 and LED units 920; the LED units 920 are disposed on the circuit plate 910.

The LED light bar 900 is secured on the back plate 80 by means of a tape 930, which is respectively attached to the circuit plate 910 and the back plate 80. The light guide plate 800 is aligned with the LED units 920 and disposed on the back plate 80; in addition, a side of the light guide plate 800 opposite to the LED unit 920 may be secured on the back plate 80 by a double-sided tape 850. As shown in FIG. 1C, when the backlight structure 90 comes into collision, the light guide plate 800 may rotate with ease, i.e. the end of the light guide plate 800 near the LED unit 920 rotates with respect to the end secured by the double-sided tape 850. At this time, a border of the light guide plate 800 may collide with the nearby LED unit 920 so as to move the LED unit 920, which results in poor electrical contact and even dropping away.

SUMMARY OF THE INVENTION

It is an object of the present invention to provide a backlight module having resistance to impact.

It is another object of the present invention to provide a backlight module which is able to reduce impact and damage to the light sources.

The present invention provides a backlight module including a back plate, a light source module and a connecting strip. The light source module is disposed on the back plate and includes a substrate and a plurality of light sources, in which the substrate extends in an extending direction, the plurality of light sources are disposed on the substrate along the extending direction. The connecting strip connects the substrate and the back plate and includes a substrate-connecting section and a back plate-connecting section, in which the substrate-connecting section is attached to the substrate, the back plate-connecting section is attached to the back plate. The substrate-connecting section has a first width parallel to the extending direction, the back plate-connecting section has a second width parallel to the extending direction and is smaller than the first width, in which the outmost light sources disposed at two sides along the extending direction protrude beyond two ends of the back plate-connecting section.

Because of the above mentioned connecting strip, the collision of the light guide plate with respect to the light sources, especially the outer light sources, is alleviated. A probability of the outer light sources escaping out of the substrate is therefore decreased so that reduces poor contact and the components' dropping away.

DETAILED DESCRIPTION OF THE PREFERRED EMBODIMENT

Figure 2:
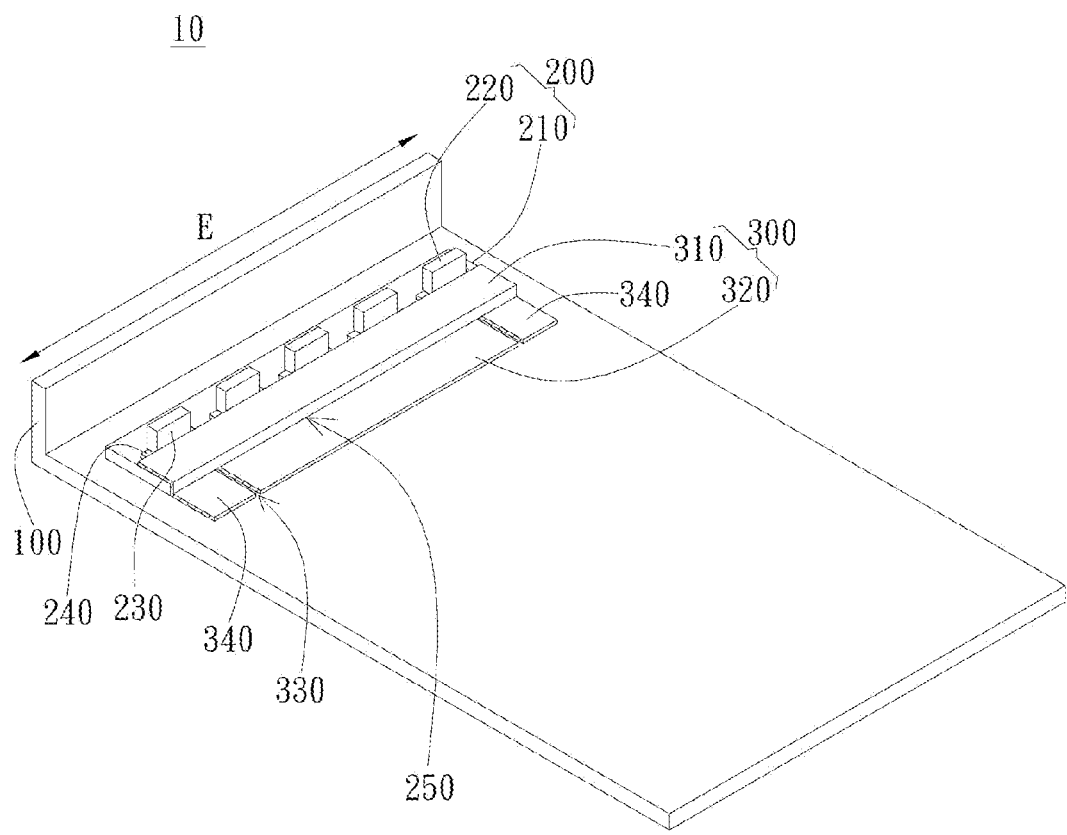
FIG. 2 is a three-dimensional view of an embodiment of the backlight module of the present invention.

FIG. 2 is a schematic view of an embodiment of the backlight module of the present invention. The backlight module 10 includes a back plate 100, a light source module 200 and a connecting strip 300, in which the light source module 200 is disposed on the back plate 100, and the connecting strip 300 connects the light source 200 and the back plate 100. The back plate 100 may be made of mental or plastic, and it may be shaped into a hollow frame or a non-hollow frame. The light source module 200 includes a substrate 210 and a plurality of light sources 220 disposed on the substrate 210; in the present embodiment, light-emitting surfaces 230 of the light sources 220 all face toward a predetermined direction. Particularly, the substrate 210 is a flexible circuit board, the light sources 220 are LED light sources; the light source 220 may have pins 240, by which the light source 220 is electrically connected to and secured on the substrate 210. Furthermore, the substrate 210 has an extending direction E, which is as well parallel to a long side of the substrate 210. The light sources 220 are generally distributed along the extending direction E with an interval between any two adjacent light sources 220. The light-emitting surfaces 230 together form an illumination side 250 of the light source module 200.

The connecting strip 300 connects the light source module 200 and the back plate 100; in addition, the connecting strip 300 is used to secure the light source module 200 to the back plate 100. Particularly, one face of the connecting strip 300 has stickiness and respectively adheres to the substrate 210 and the back plate 100. In one embodiment of the present invention, the connecting strip 300 is disposed at the illumination side 250 of the light source module 200, in front of the light sources 200, along the extending direction E and attached to the substrate 210 and a portion of the back plate 100 at the illumination side 250. In other words, the backlight module 200 has the connecting strip 300 at the illumination side 250 and disposed along the extending direction E.

The connecting strip 300 includes a substrate-connecting section 310 and a back plate-connecting section 320. The substrate-connecting section 310 is attached to a portion of the substrate 210 in front of the light source 220, i.e. the light-emitting surface 230 of the light source 220 faces toward the substrate-connecting section 310. The portion of the substrate 210 to which the substrate-connecting section 310 is attached is a surface-portion of the substrate 210 opposite to the back plate 100. The back plate-connecting section 320 is connected to the substrate-connecting section 310 and connected to the back plate 100. In the present embodiment, the back plate-connecting section 320 and the substrate-connecting section 310 of the connecting strip 300 are formed in an integral; particularly, the connecting strip 300 may be cut from a sheet material. In other embodiments, the back plate-connecting 320 and the substrate-connecting section 310 may be joined as separated parts to form the connecting strip 300. The substrate-connecting section 310 and the back plate-connecting section 320 may be arranged along a direction perpendicular to the extending direction E; as shown in FIG. 2, the substrate-connecting section 310 is located between the light sources 220 and the back plate-connecting section 320.

Figure 3A:
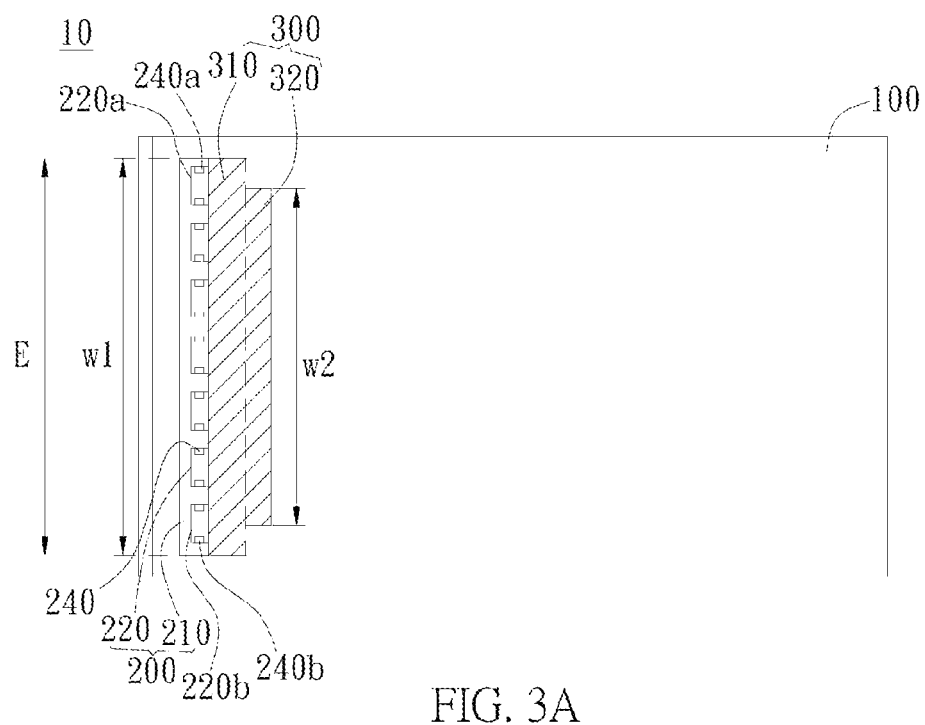
FIG. 3A is a top view of an embodiment of the backlight module of the present invention.

FIG. 3A is a top view of an embodiment of the backlight module of the present invention. Please refer to FIG. 3A, the substrate-connecting section 310 has a first width w1 parallel to the extending direction E, the back plate-connecting section 320 has a second width w2 parallel to the extending direction E, in which the first width w1 is greater than the second width w2. In the present embodiment, the light sources 220 includes a light source 220a and a light source 220b which are disposed along the extending direction E and located outermost on two opposite ends of the substrate 210, in which a distance in the extending direction E between an outer side of the light source 220a and an outer side of the light source 220b is greater than the second width w2, i.e. the outer portion of the light source 220a and the outer portion of the light source 220b protrude beyond two ends of the back plate-connecting section 320. In one embodiment, the light source 220a and 220b respectively have outer pins 240a and 240b, in which a distance between the pin 240a and the pin 240b is greater than the second width w2, i.e. the pin 240a and 240b protrude beyond two ends of the back plate-connecting section 320. Furthermore, as shown in FIG. 3A, the substrate-connecting section 310 with the first width w1 preferably along the extending direction E protrudes beyond two ends of the back plate-connecting section 320 with equal length; in other words, the center of the substrate-connecting section 310 is aligned with the center of the back plate-connecting section 320. As a result, the back plate-connecting substrate 320 and the substrate-connecting section 310 form a T-shaped connecting strip 300.

Figure 3B:
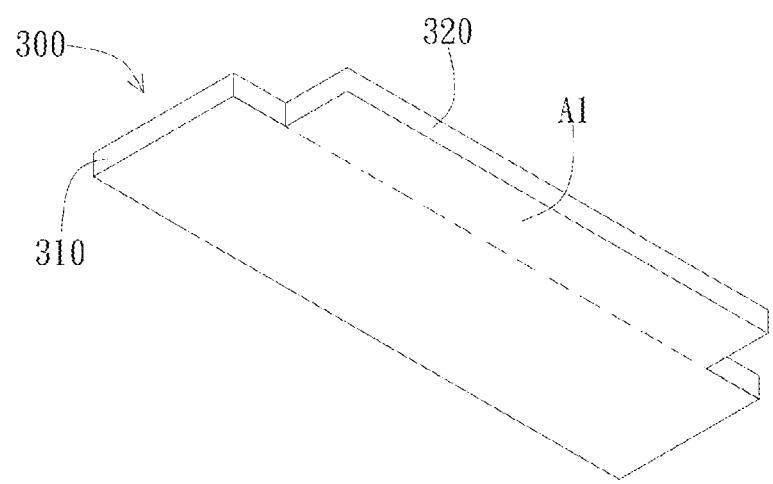
FIG. 3B is a three-dimensional view of an embodiment of the connecting strip of the present invention.

FIG. 3B is a schematic view of the embodiment of the connecting strip 300 shown in FIG. 3A. The connecting strip 300 includes the substrate-connecting section 310 and the back plate-connecting section 320. In general, the back plate-connecting section 320 has an adhesive area A1. The back plate-connecting section 320 is attached to the back plate 100 with a surface having the adhesive area A1 facing the back plate 100.

Figure 4A:
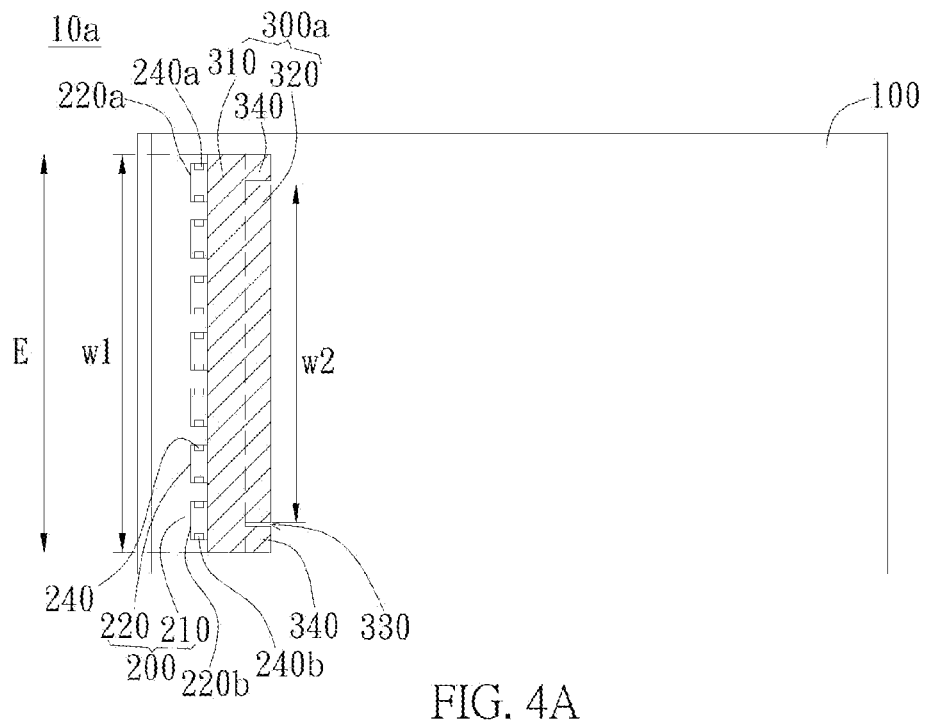
FIG. 4A is a top view of the embodiment of the backlight module shown in FIG. 2.

In one embodiment, as the backlight module 10a shown in FIG. 4A, the connecting strip 300a further includes at least one reflection portion 340. As mentioned above, the substrate-connecting section 310 with the first width w1 in the extending direction E protrudes beyond two ends of the back plate-connecting section 320, which has the second width w2. In the embodiment, the reflection portion 340 extends from a portion of the substrate-connecting section 310 protruding beyond the back plate-connecting section 320 and away from the light source 220, as well as locates outside two ends of the back plate-connecting section 320. A gap 330 is formed between the reflection portion 340 and the back plate-connecting section 320. In one embodiment, the gap 330 corresponds to a portion between two pins 240 of an outer light source such as the light source 220a and/or 220b. Preferably, the gap 330 may locate corresponding to an inner side of the pin 240a or 240b; in which the gap 330 may align with a center of the light source 220a and/or the light source 220b. The reflection portion 340 is preferably not attached to the back plate 100 so that it is able to move relative to the back plate 100 with ease. However, even the reflection portion 340 in other embodiments may be attached to the back plate 100 to increase structure stability, the gap 330 can still serve as a buffer and allow the reflection portion 340 to move relative to the back plate 100 easier than the back plate-connecting section 320 aside dose. In addition, the adhesion or attachment between the reflection portion 340 and the back plate 100 can be weaker than the adhesion or attachment between the back plate-connecting section 320 and the back plate 100. In comparison to the embodiment of the connecting strip 300 and the backlight module 10 shown in FIG. 3A-3B, the reflection portion 340 improves reflection of the connecting strip 300a and the backlight module 10a so as to directly or indirectly improve optical performance.

Figure 4B:
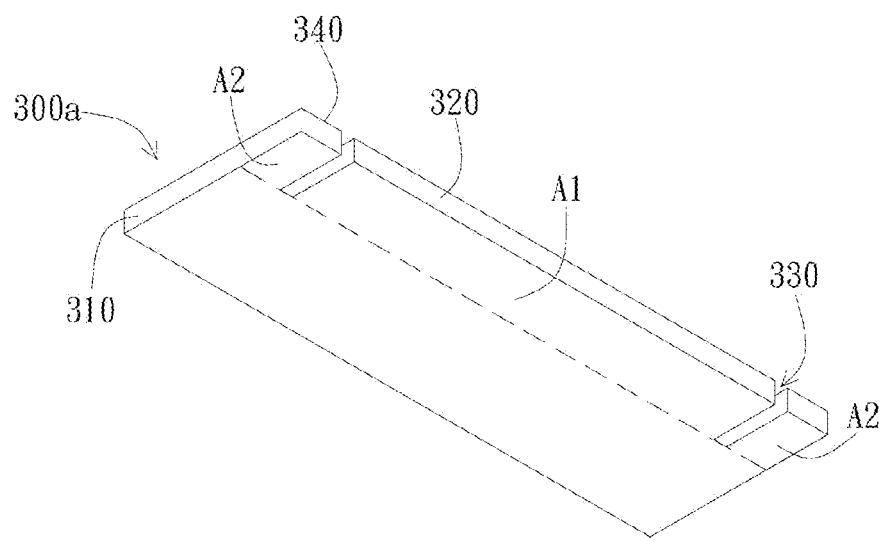
FIG. 4B is a three-dimensional view of another embodiment of the connecting strip of the present invention.

With regard to the backlight module 10a mentioned above, the connecting strip 300a preferably has the adhesive area and at least one non-adhesive area. The at least one non-adhesive area is distributed aside the adhesive area, in which a width of the adhesive area parallel to the extending direction E is less than the first width w1. FIG. 4B demonstrates a schematic view from a lower viewpoint. As FIG. 4B shows, the adhesive area A1 and the at least one non-adhesive A2 are distributed on a surface of the connecting strip 300 toward or facing the substrate 210 and the back plate 100, in which the at least one of the non-adhesive area A2 is distributed along the extending direction E and close to the ends of the connecting strip 300. Preferably, the adhesive area A1 is distributed in the back plate-connecting section 320; meanwhile, the back plate-connecting section 320 is attached to the back plate 100 through the adhesive area. The non-adhesive area A2 is distributed on the reflection portion 340; meanwhile, the reflection portion 340 is able to move relative to the back plate 100 with ease comparing to the back plate-connecting section 320 having the adhesive area A1.

In another embodiment of the back light module 10a, the surface of the connecting strip 300a facing the substrate 210 and the back plate 100 have varied stickiness; in which the surface of the connecting strip 300a facing the substrate 210 and the back plate 100 can be referred as the back side of the connecting strip 300. For example, the back sides of the substrate-connecting section 310 and the back plate-connecting section 320 have a first stickiness while the back side of the reflection portion 340 has a second stickiness, in which the first stickiness is greater than the second stickiness. Therefore, it is easier for the reflection portion 340 to move relative to the back plate 100 than the back plate-connecting section 320 does.

In still another embodiment of the back light module 10a, the adhesive area A1 of the back plate-connecting section 320 has a first stickiness while the reflection portion 340 has no adhesive on its back side. In addition, the reflection 340 has no stickiness or has stickiness weaker than the first stickiness. It is easier for the reflection portion 340 to move relative to the back plate 100 than the back plate-connecting section 320 does.

Figure 5A:
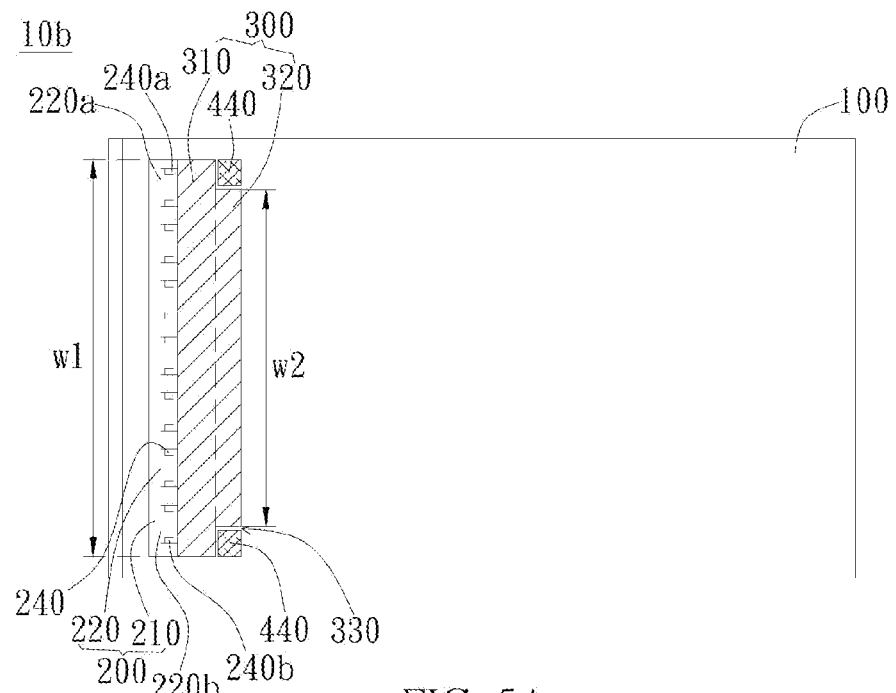
FIG. 5A is a top view of another embodiment of the backlight module of the present invention.
Figure 5B:
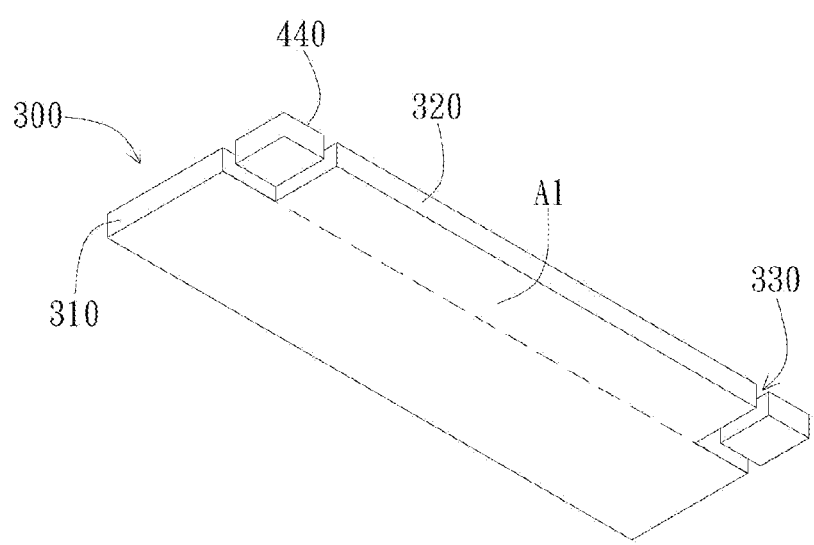
FIG. 5B is a three-dimensional view of another embodiment of the connecting strip of the present invention.

FIG. 5A is a top view of another embodiment of the present invention. As FIG. 5A shows, the backlight module 10b includes the back plate 100, the light source module 200 and the connecting strip 300, and further includes a reflection portion 440. The reflection portion 440 may be independent from the connecting strip 330 and disposed on the back plate 100; in which preferably, the reflection portion 440 is disposed in front of the substrate 210. The reflection portion 440 may be disposed in accordance with the T-shaped connecting strip 300 and disposed/distributed at least partially in a recess between the back plate-connecting section 320 and the substrate-connecting section 310; in other words, the reflection portion 440 is at least partially outside the end of the back plate-connecting section 320 in the extending direction E. As shown in FIG. 5A-5B, the reflection portion 440 is outside the end of the back plate-connecting section 320 in the extending direction E and substantially complements the recess beside the T-shaped connecting strip 300 so that the backlight module 10b provides better reflection. On the other hand, reflection portions with different reflectance can be used to deal with the uneven illumination problem at corners.

Particularly, the reflection portion 440 may be a light-reflective component which has stickiness, such as a light-reflective sheet having an adhesive layer, and attached to the back plate 100. Alternatively, the reflection portion 440 may be a light-reflective area formed on the back plate 100.

In one embodiment, the substrate-connecting section 310 having the width w1 protrudes beyond two ends of the back plate-connecting section 320, which has the width w2; the reflection portion 440 could be located outside the ends of the back plate-connecting section 320 in the extending direction E as well as adjacent to the portion of the substrate-connecting section 310 protruding beyond the back plate-connecting section 320. The reflection portion 440 is not connected to the back plate-connecting section 320 but spaced therefrom with the gap 330. In one embodiment, the gap 330 may align with the center of the outer light source 220a and/or the light source 220b.

In some embodiments, such as those shown in FIG. 3B, 4B and 5B, the connecting strip 300 and 300a have reflectance greater than 65% so as to improve light-entrance efficiency.

Figure 6:
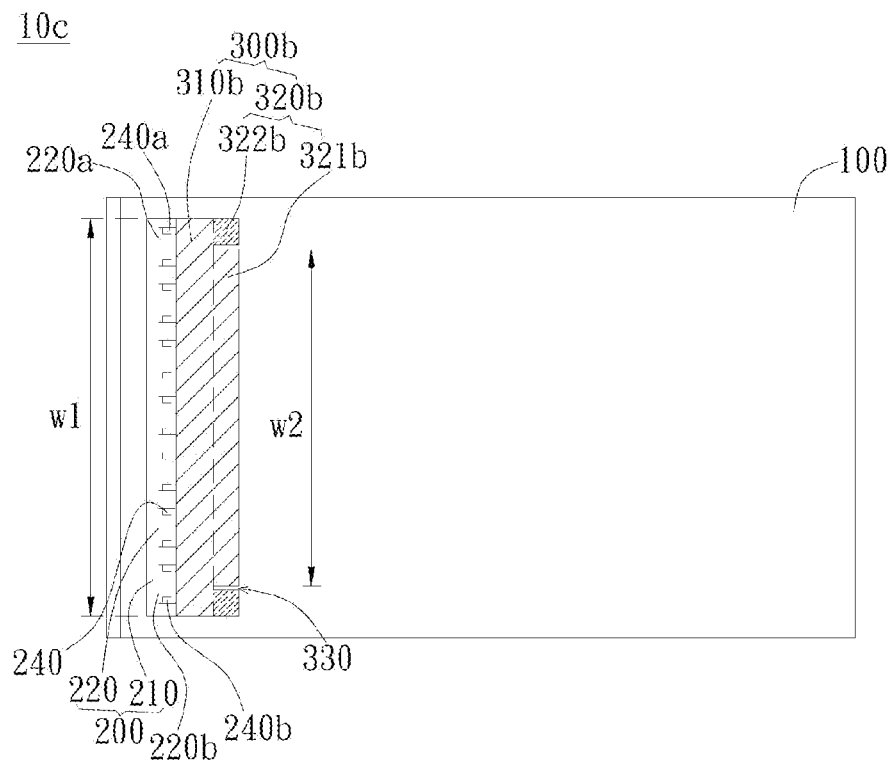
FIG. 6 is a top view of another embodiment of the backlight module of the present invention.

FIG. 6 is a top view of another embodiment of the present invention. As shown in FIG. 6, the back light module 10c includes the back plate 100, the light source module 200, and a connecting strip 300b. The connecting strip 300b connects the light source module 200 and the back plate 100. In addition, the connecting strip 300b secures the light source module 200 to the back plate 100. The connecting strip 300b includes a substrate-connecting section 310b and a back plate-connecting section 320b. The substrate-connecting section 310b has stickiness and adheres to the portion of the substrate 210 in front of the light source 220, i.e. the light-emitting surface 230 of the light source 220 faces toward the substrate-connecting section 310b. The back plate-connecting section 320b is connected to the substrate-connecting section 310b as well as to the back plate 100. Therefore, the substrate-connecting section 310b and the back plate-connecting section 320b of the connecting strip 300 may be arranged along the direction perpendicular to the extending direction E.

The back plate-connecting section 320b further includes at least one main section 321b and at least one minor section 322b. A gap 330 is formed between the main section 321b and the minor section 322b; in other words, the gap 330 is the interface between the main section 321b and the minor section 322b. The main section 321b is preferably a central portion of the back plate-connecting section 320b, the minor section 322b is located at end(s) of the main section 321b, i.e. outside two ends of the main section 321b in the extending direction E. In addition, the adhesion between the main section 321b and the back plate 100 is stronger than the adhesion between the minor section 322b and the back plate 100. Particularly, the main section 321b has stickiness and is attached to the back plate 100 with a sticky side, which faces and attaches to the back plate 100. In comparison, the minor section 322b may have weaker stickiness or no stickiness.

In the embodiment, the connecting strip 300b has a first width w1 parallel to the extending direction E, in which the width w1 is substantially the width of the substrate-connecting section 310b parallel to the extending direction E. On the other hand, the main section 321b of the back plate-connecting section 320b has a second width w2. In addition, with regard to the light sources 220 located outmost nearby two opposite ends of the substrate 210, i.e. the light source 220a and 220b, a distance therebetween, i.e. the distance in the extending direction E between the outer side of the light source 220a and the outer side of the light source 220b, may be greater than the second width w2. In other words, the outer light sources 220a and 220b respectively protrude beyond the two ends of the main section 321b. In one embodiment, the outer pin 240a of the outer light source 220a and/or the outer pin 240b of the outer light source 220b respectively protrude beyond the two ends of the main section 321b.

Figure 7:
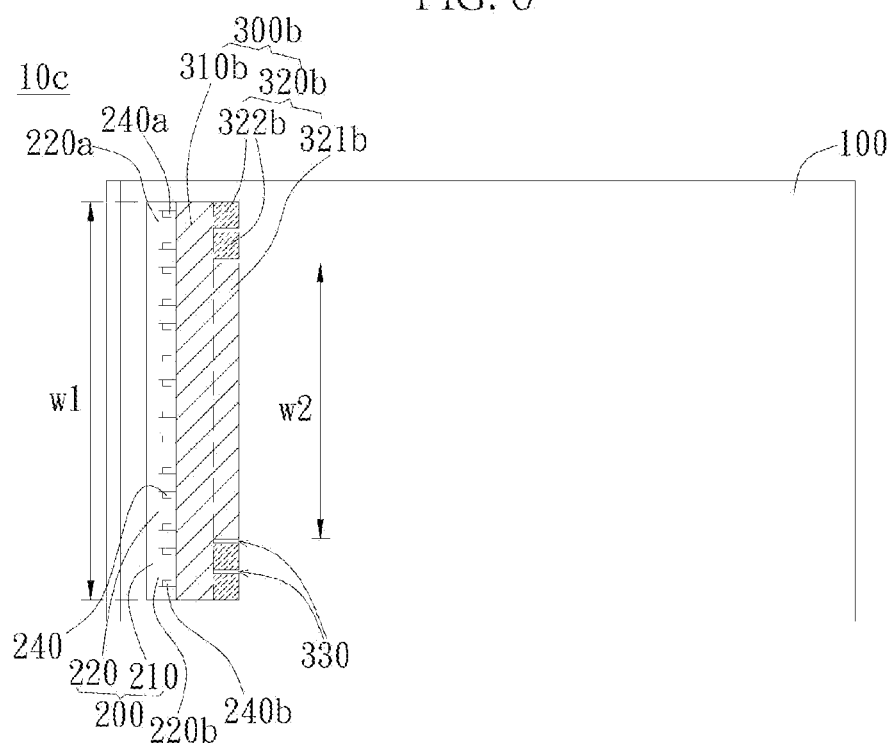
FIG. 7 is a top view of another embodiment of the backlight module of the present invention.

In addition, the gap 330 of the connecting strip 330b is preferably located corresponding to the outer light source such as the light source 220a and/or 220b. Particularly, a projection of the outer light source 220a and/or 220b on the connecting strip 300b traverses the gap 330 and falls onto two sides of the gap 330, i.e. falls onto the main section 321b and the minor section 322b. In one embodiment, the gap 330 aligns with the center of the light source 220a and/or 220b. In other embodiments, there may be two or more gaps formed near two opposite ends of the back plate-connecting section 320b. FIG. 7 is a top view of another embodiment of the backlight module of the present invention. As FIG. 7 shows, there are two or more gaps 330 on each side so that there may be more minor sections 322b in addition to the main section 321b. The plurality of minor sections 322b may have different connecting strengths with respect to the back plate 100 and further adjust the buffer capacity of the connecting strip 300b depending upon to their locations along the extending direction E as well as maintain reliable connection.

With regard to the backlight module 10c mentioned above, the connecting strip 300b preferably has an adhesive area and at least one non-adhesive area. The at least one non-adhesive area is distributed aside the adhesive area, in which a width of the adhesive area parallel to the extending direction E is less than the first width w1. Please refer to FIG. 4B, the adhesive area A1 and the at least one non-adhesive A2 are distributed on a surface of the connecting strip 300b or 300a toward or facing the substrate 210 and the back plate 100. Preferably, the adhesive area A1 and the non-adhesive area A2 are distributed in the back plate-connecting section 320b; accordingly, the back plate-connecting section 320 has a central portion with stickiness and two end portions without stickiness. The back plate-connecting section 320 is attached to the back plate 100 through the adhesive area A1. In addition, it is preferable that the main section 321b has the adhesive area A1 while the minor section 322b has the non-adhesive area A2. The back plate-connecting section 320 is attached to the back plate 100 through the main section 321b, in which the main section 321b may not move relative to the back plate 100 as easy as the minor section 322b.

With regard to the backlight module 10c mentioned above, in one embodiment, the minor section 322b of the connecting strip 300b may have reflectance greater than 65%. Alternatively, the reflection portion of the present invention such as the reflection portion 340 preferably has reflectance greater than 65%. In another embodiment, the reflection portion 440 has reflectance greater than 65%, but not limited thereto. The reflectance of the connecting strip, the minor section thereof or the reflection portion may be modified depending upon conditions such as uneven light exiting.

The backlight module may further include a light guide plate. In embodiments described above, the afore-mentioned backlight module 10 includes the back plate 100, the light source module 200, the connecting strip 300, and further a light guide plate 600. The afore-mentioned backlight module 10a includes the back plate 100, the light source module 200, the connecting strip 300a, and further the light guide plate 600. The backlight module 10b includes the back plate 100, the light source 200, the connecting strip 300, the reflection portion 440, and further the light guide plate 600. The backlight module 10c includes the back plate 100, the light source module 200, the connecting strip 300b, and further the light guide plate 600.

Figure 8:
FIG. 8 is a side view of an embodiment of the backlight module of the present invention.

FIG. 8 is a side view of the embodiment of the backlight module 10a of the present invention. In the embodiment shown in FIG. 8, the light guide plate 600 has a light-entering surface 610, in which the light guide plate 600 is disposed at the illumination side 250 of the light source module 200 with its light-entering surface 610 facing the light-emitting surface 230. Particularly, the light guide plate 600 is located at the illumination side 250 of the light source module 200. The connecting strip 300a attaches to the back plate 100 and the portion of the substrate 210 in front of the light source 220 at the illumination side 250 located between the light guide plate 600 and the back plate 100.

In one embodiment of the present invention, the light guide plate 600 is further connected to the back plate 100 at a side opposite to light-entering surface 610. For example, the side of the light guide plate 100 opposite to the light-entering surface 610 may be secured to the back plate 100 with a tape 700 so that the light guide plate 600 is secured to the back plate 100.

Figure 1A:
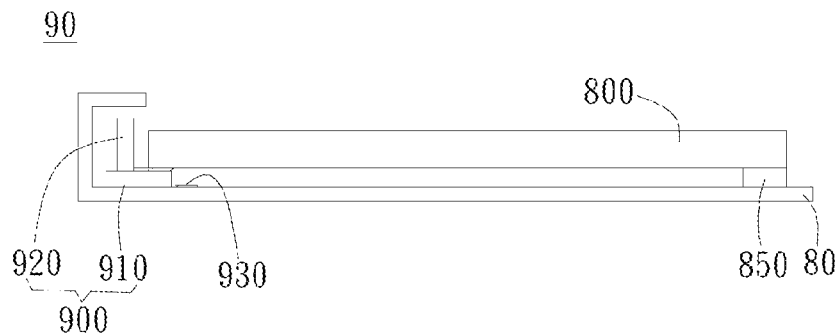
FIGS. 1A-1B show a schematic view of the conventional display module.
Figure 1B:
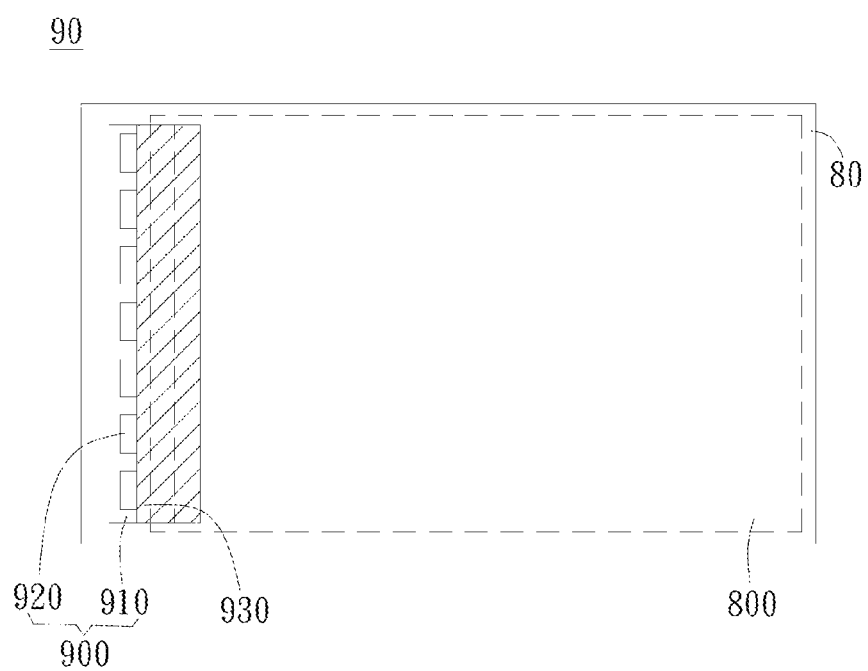
Figure 1C:
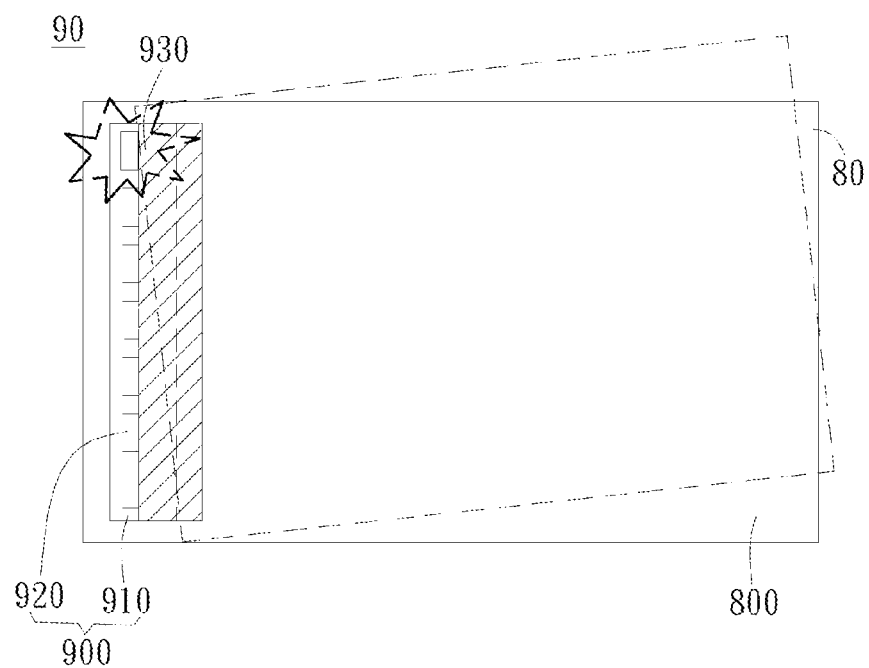
FIG. 1C is a top view which shows a conceivable movement of the conventional display module.
Figure 9:
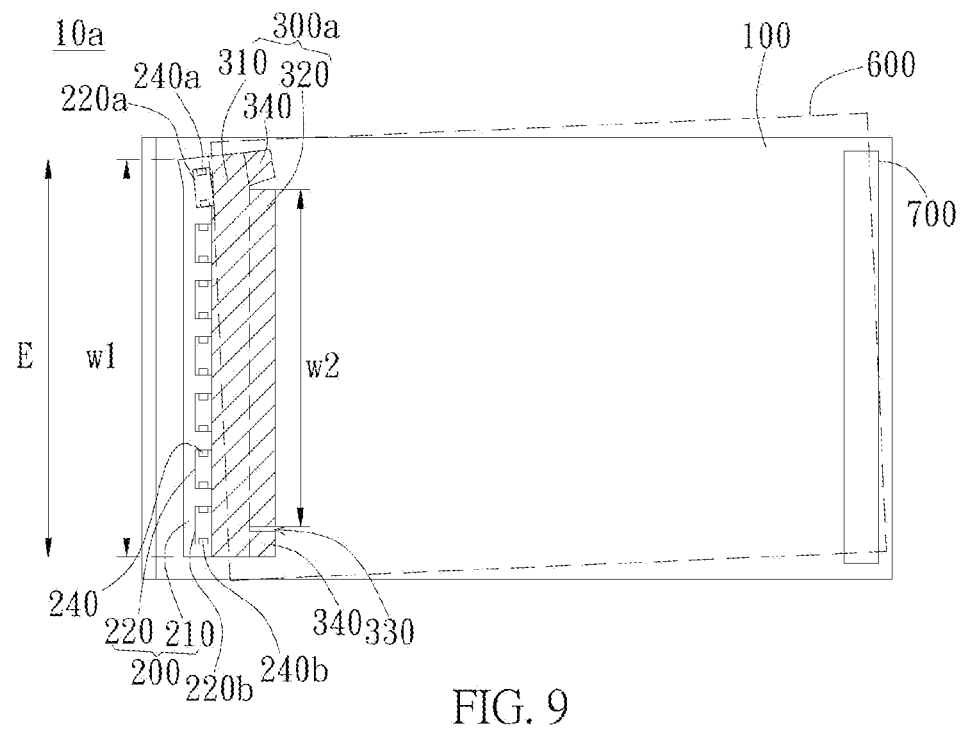
FIG. 9 is a top view which shows a conceivable movement of the backlight module shown in FIG. 8.

FIG. 9 is a top view which shows a conceivable movement of the backlight module shown in FIG. 8. FIG. 9 shows that the light guide plate 600 moves and rotates around the area where is secured by the tape 700, and the area substantially becomes a pivot. As shown in FIG. 9, the moving light guide plate 600 pushes the outer light source 220a. Since the connecting strip 300a is not attached to the back plate 100 thoroughly along a full length of the substrate 210 with the tape 930, unlike the conventional light source module 900 shown in FIG. 1A-1B in which the circuit board 910 is secured to the back plate 80 along its full length, the adhesion between the light source 200 and the back plate 100 is weaker due to the non-adhesiveness or weaker stickiness on two sides of the connecting strips 300, 300a, and 300b. On the other hand, when the light guide plate 600 is secured to the back plate 100 at the side opposite to the light-entering surface 610 by the tape 700, the light-entering surface 610 of the light guide plate 600 can still be free to move and rotate on a two-dimensional plane parallel to the back plate 100 so as to interfere with the light source 200. The weaker adhesion between the light source 200 and the back plate 1400 therefore allows the substrate 210 to deform/bend when the light source 220 is impacted. In other words, the light source module of the present invention can absorb the force coming from the light guide plate 600's pushing so as to reduce damage to the light source 220, such as the outer light sources 220a and/or 220b. Therefore, the problems of poor contact or components' dropping away may be solved.

Further speaking, in the embodiment of the backlight module 10 and 10b, the length of the substrate 210 parallel to the extending direction E is substantially equal to w2, the back plate-connecting section 320 is drawn back with respect to the substrate 210, and the length of the back plate-connecting section 320 is w1, which is smaller than w2. In other words, the adhesion between the connecting strip 300 and a portion of the back plate 100 in front of two ends of the substrate 210 is relatively weak. Similarly, in the embodiment of the backlight module 10a, the adhesion between the reflection portion 340 and the back plate 100 is weaker than the adhesion between the back plate-connecting section 320 and the back plate 100; alternatively, the reflection portion 340 is not attached to the back plate 100, in which the gap 330 is formed between the reflection portion 340 and the aside back plate-connecting section 320. Accordingly, the reflection portion 340 is able to move relative to the back plate 100 with ease comparing to the back plate-connecting section 320. In the embodiment of the backlight module 10c, the adhesion between the main section 321b of the connecting strip 300b and the back plate 100 is stronger than the adhesion between the minor section 322b and the back plate 100, in which the gap 330 is formed between the main section 321b and the minor section 322b.

Further demonstrating with FIG. 9. The adhesion or attachment between the reflection portion 340 of the connecting strip 300a and the back plate 100 is weaker than the adhesion or attachment between the back plate-connecting section 320 and the back plate 100, in which the reflection portion 340 is spaced apart from the plate-connecting section 320 with the gap 330. Accordingly, the reflection portion 340 may move relative to the back plate-connecting section 320 so as to comply with the movement of the light guide plate 600 of pushing the outer light source 220a; in other words, a portion of the connecting strip 300a connected to the portion of the back plate 100 in front of the two ends of the substrate 210 may deform, which could therefore alleviate the impact of the light guide plate 600 to the outer light source 220a. Therefore, for example, the outer light source 220a's escaping away from the substrate 210 is reduced. Poor contact of the light source 220, 220a or 220b or the components' dropping away is reduced.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A backlight module, including:
   a back plate;
   a light source module disposed on the back plate, the light source module including:
      a substrate having an extending direction; and
      a plurality of light sources disposed on the substrate in the extending direction;
   a connecting strip connecting the substrate and the back plate, the connecting strip including:
      a substrate-connecting section attached to the substrate; and
      a back plate-connecting section connected to the substrate-connecting section and attached to the substrate;
   wherein the substrate-connecting section has a first width parallel to the extending direction, the back plate-connecting section has a second width parallel to the extending direction, the first width is greater than the second width, wherein the outmost light sources disposed at two sides along the extending direction protrudes respectively beyond two opposite ends of the back plate-connecting section.

2. The backlight module of claim 1, wherein a reflectance of the connecting strip is greater than 65%.

3. The backlight module of claim 1, wherein light-emitting surfaces of the light sources face toward the substrate-connecting section.

4. The backlight module of claim 1, wherein the substrate-connecting section in the extending direction protrudes beyond the back plate-connecting section; the connecting strip includes at least one reflection portion extending from a portion of the substrate-connecting section protruding beyond the back plate-connecting section and away from the light sources; a gap is formed between the reflection portion and the back plate-connecting section.

5. The backlight module of claim 4, wherein the reflection portion moves relative to the back plate easier than the back plate-connecting section does.

6. The backlight module of claim 4, wherein the substrate-connecting section and the back plate-connecting section has a first stickness on their back sides, a back side of the reflection portion has a second stickness weaker than the first stickness.

7. The backlight module of claim 4, wherein a back side of the reflection portion has no adhesive material.

8. The backlight module of claim 1, further including a reflection portion connected to the back plate and located outside an end of the back plate-connecting section in the extending direction.

9. The backlight module of claim 1, wherein the light sources are distributed along the extending direction; the outmost light source each has two pins, wherein the outer pin in the extending direction protrudes beyond an end of the back plate-connecting section.

10. The backlight module of claim 1, wherein the back plate-connecting section includes at least one main section and at least one minor section arranged along the extending direction, a gap is formed between the main section and the minor section, wherein a adhesion between the main section and the back plate is stronger than a adhesion between the minor section and the back plate.

11. The backlight module of claim 10, wherein the minor section is disposed in the extending direction outside an end of the main section.

12. The backlight module of claim 10, wherein the connecting strip has an adhesive area and a non-adhesive area disposed aside the adhesive area in the extending direction, wherein the adhesive area has a width in the extending direction smaller than the first width.

13. The backlight module of claim 12, wherein the adhesive area and the non-adhesive area are located on the back plate-connecting section, the adhesive area is located on the at least one main section and the non-adhesive area is located on the at least one minor section.

14. The backlight module of claim 1, further including a light guide plate, wherein the light guide plate has a light-entering surface, wherein light-emitting surfaces of the light sources faces toward the light-entering surface, and the connecting strip is located between the light guide plate and the back plate.

* * * * *